July 9, 1940. C. E. SWENSON Re. 21,507

UNIVERSAL JOINT

Original Filed Dec. 9, 1932

Inventor:
Carl E. Swenson
By: Edward C. Gritzbaugh
Atty.

Reissued July 9, 1940 Re. 21,507

UNITED STATES PATENT OFFICE 21,507

UNIVERSAL JOINT

Carl E. Swenson, Rockford, Ill., assignor, by mesne assignments, to Borg-Warner Corporation, Chicago, Ill., a corporation of Illinois Original No. 2,113,998, dated April 12, 1938, Serial No. 646,432, December 9, 1932. Application for reissue April 8, 1940, Serial No. 328,560

6 Claims. (Cl. 64—17)

This invention relates to an improved universal joint of the type embodying trunnions journalled in roller bearings, wherein each of the trunnion bearings, comprising a bearing cup and bearing rollers therein, is of unitary construction to facilitate assembling and make for handiness as well as economy in replacement or repair, wherein the bearing rollers of each bearing are retained in assembled relation therein by means of a retainer ring pressed into a counterbore in the open end of the bearing, and wherein there is provided between the end of the cup and the bore of the trunnion, an annular recess for the reception of a packing ring to seal the bearing against loss of lubricant. It is the principal object of the present invention to provide a universal joint of this type which combines maximum efficiency of dirt exclusion and lubricant retention with maximum simplicity of construction and minimum manufacturing cost. To this end, the invention contemplates a joint of the type specified wherein the bearing roller retaining ring is formed integrally with a cylindrical skirt having the triple function of forming a press fit connection with the bearing, supporting the periphery of the packing ring so that the latter may be projected beyond the end of the bearing cup, and closely telescoping into a sleeve that is pressed onto the spider about the base of the trunnion so as to form a centrifugal seal for excluding dirt from access to the packing.

The invention is illustrated in the accompanying drawing in which.

Figure 1:
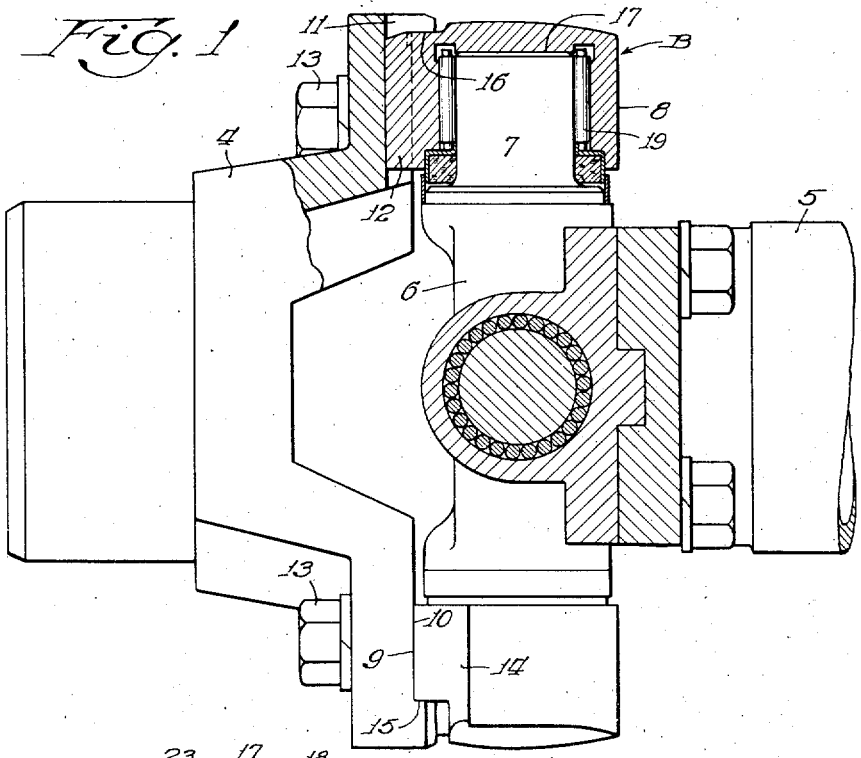
Fig. 1 is a side view of a universal joint made in accordance with my invention, showing one trunnion bearing in longitudinal cross-section and another in transverse section.
Figure 2:
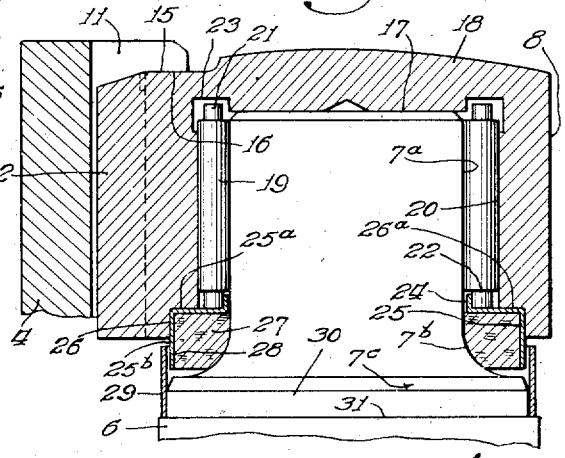
Fig. 2 is an enlargement of that portion of Fig. 1 showing the longitudinal section.
Figure 3:
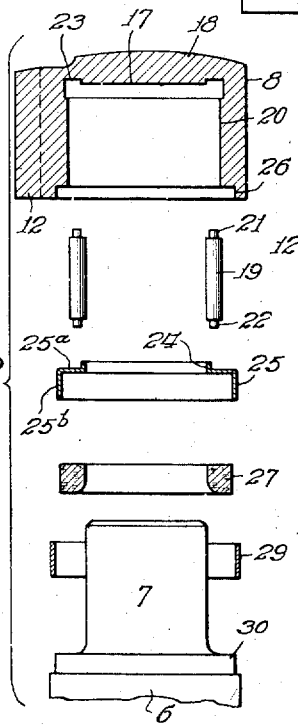
Fig. 3 is an exploded view of the bearing parts appearing in Fig. 2.

The invention is illustrated in connection with a universal joint constructed somewhat along the lines disclosed in my application Serial No. 615,496, filed June 6, 1932, issued as Patent No. 1,985,531 December 25, 1934. A pair of yokes or terminal coupling members, shown at 4 and 5, are connected by means of an intermediate transmission member or spider 6, providing four trunnions 7, ninety degrees apart. The trunnions 7 are journalled in bearings B, each yoke being equipped with one pair of these bearings in diametrically opposed relation. Each bearing B comprises a bearing cup 8 having a cylindrical inner bore or bearing wall 20 and a plurality of bearing rollers 19 retained in assembled relationship in contact with the bearing wall 20 by means of a retainer ring 25 which is mounted in the bearing cup 8 in a manner which will be described hereinafter.

As described in the aforesaid patent, the yokes are machine finished for true dynamic balance and have smooth seats 9 for abutment by flat faces 10 provided on the backs of the bearing cups 8. The yokes are milled to provide radial slots 11 for reception of radial lugs 12 on the bearing cups, and are bored on opposite sides of the slots 11 to receive bolts 13 which are threaded in holes in the lugs 14 formed on the bearing cups, whereby to clamp the latter to the yokes. The interfitting lugs and slots assume the torque load transmitted between the yokes. Shoulders 15 are provided on the yokes for engagement with the surfaces 16 on the bearing cups 8 to assume the centrifugal loads developed in the bearing under operation, the trunnions 7 being disposed with the ends thereof in thrust bearing engagement with the inner surfaces 17 of the end walls 18 of the bearing cups 8. The bolts 13 are, therefore, relieved of centrifugal and torque loads and serve primarily to clamp the bearing cups to the yoke members.

The trunnion bearings B instead of being plain journal bearings, have the anti-friction rollers 19 which make for easier and smoother operation and consequently more efficient power transmission and longer life. The rollers 19 have rolling engagement with the cylindrical bearing surface 7a of the trunnion 7 on the one hand, and on the other hand with the inner bearing wall 20 of the bearing cup 8. Each trunnion 7 is formed with an inner wall comprising the cylindrical bearing portion 7a and a base portion 7b flaring outwardly into an integral shoulder 7c, and an outer wall 29.

The bearing cup 8 is formed with a counterbore 26 of larger diameter than the bore or bearing wall 20 and separated therefrom by an offset shoulder 26a. Pressed into the counterbore 26 is a retainer ring 25. The retainer ring 25 includes a cylindrical skirt portion 25b and a radially inwardly extending flange 25a together cooperating with the inner trunnion wall to define a substantially closed annular space in which is received a packing ring 27 of any suitable compressible resilient packing material, such as cork.

The radial flange 25a projects substantially across the annular space between the bearing walls 7a and 20. This projecting portion of the retainer ring has the dual function of supporting the packing ring 27 against extrusion into the roller space and of maintaining the rollers in proper cooperative relationship to the bearing walls 7a and 20, i. e., preventing the rollers from longitudinal movement. Thus the packing 27 is protected against the rollers digging into the packing. The flange 25a also cooperates with the rollers in holding them in assembled relationship in the bearing cup when the latter is removed from the trunnion. Such retension of the rollers may be made more secure if desired by the provision of reduced ends 21 and 22 on the rollers, a channel-shaped groove 23 in the end wall 18 of the bearing and an inturned lip 24 on the inner extremity of the flange 25a. The groove 23 is made wider than the diameter of the ends 21 because it is intended only to serve as the retaining recess for the ends of the rollers to maintain the latter against dropping out of the bearing cup when the cup is removed from the trunnion. In other words, it is not intended to have the ends 21 of the rollers derive bearing support in the grooves 23 in operation of the joint.

The packing ring 27 is inserted in the retainer ring 25 before the bearing is slipped over the trunnion, and is arranged to be subjected to a certain amount of compression when the bearing is brought into its final assembled position, thus serving to seal the bearing against loss of lubricant or entry of dirt. The packing ring is adapted to make sealing contact with the inner trunnion wall, including both the cylindrical portion 7a and the flared portion 7b thereof.

In accordance with the present invention only a portion of the packing ring is received within the bearing cup 8, and the retainer ring 25 is adapted to serve not only as a means of retaining the rollers 19 but also as a means for housing the packing ring 27, and providing support for the projecting portion thereof, and, in addition, as a part of a dirt shield for the bearing. With that object in view, the outer end of the skirt portion 25b is projected appreciably from the counterbore 26 beyond the ends of the bearing cup as indicated at 28, to form the inner part of the dirt shield, and the outer wall 29 is projected beyond the shoulder 7c toward the end of the trunnion 7 in radially spaced relationship to the base portion 7b of the inner trunnion wall so as to define therewith a single annular channel accommodating the projecting portion 28 of the retainer ring and the packing therein. The wall 29 forms the outer wall of this space, the inner wall thereof being the integral inner wall surface of the trunnion, against which the packing ring makes sealing contact with a maximum of sealing efficiency.

The skirt portion 28 is closely telescoped in the outer trunnion wall 29 so as to form a centrifugal seal. That is, the close telescoping of the wall 29 over the projecting portion 28 of the retainer ring skirt 25b, makes centrifugal force effective in keeping out dirt and water, because any dirt or water getting on the wall 29 will naturally be thrown outwardly and will therefore have no opportunity to work its way in between the wall 29 and the skirt 25b and eventually into the bearing. Thus the principal function of the packing ring 27 is merely that of retaining lubricant.

That portion of the skirt 25b which does not project beyond the bore 26, has the function of maintaining frictional contact with the bore 26 so as to secure the ring 25 in place.

The outer trunnion wall 29 is in the form of a collar which is separate from the trunnion and mounted upon the shoulder 7c of the trunnion, having a press fit connection with the cylindrical peripheral surface 30 of the shoulder with its end in abutment with a shoulder 31 defining the end of the cylindrical surface 30. The shoulder 31 locates the collar in predetermined relation to the bearing and determines the proper amount of telescoping.

By employing a separate collar, the outer trunnion wall may be made of minimum thickness in proportion to its extent of projection beyond the shoulder 17 without sacrificing strength. It also makes it possible to secure a smooth machining operation on the inner trunnion wall, eliminating difficulties that would be experienced if attempt were made to machine a channel axially into the shoulder 7c.

It makes it possible to provide an annular channel of ample dimensions in the base of the trunnion, adapted to receive both the retainer skirt and the packing ring. To attempt to provide such a channel by machining the same in the trunnion shoulder, would require considerable increase in the diameter of the shoulder, which would be objectionable.

There are several important advantages of projecting both the packing and the retainer skirt beyond the end of the bearing cup, and forming the centrifugal seal around the projecting skirt portion. By accommodating only a portion of the axial depth of the packing within the bearing cup, the area of bearing surface within the cup, and the length of the rollers, is increased without sacrificing the highly desirable axial depth of the packing ring. Such axial depth provides for ample sealing area and sufficient compressibility. This advantage is attained without increasing the axial depth of the cup. Conversely, for a given roller length, the length of the cup may be reduced, thus effecting a definite saving in material cost.

On the other hand, projecting the packing ring beyond the end of the bearing cup does not require any material increase in the overall axial dimension of the trunnion and bearing assembly, since the projecting region of the packing simply occupies space within the centrifugal seal, i. e., both lie in a common radial plane.

Another important advantage of forming the seal between the collar 29 and the projecting skirt portion 28 is the elimination of the necessity for machining the end of the bearing cup 8 to provide a cylindrical flange capable of being telescoped into the outer trunnion wall. To form such a flange would require cutting back the end of the lug 12, thus objectionably shortening the lug and requiring an added operation which likewise would be objectionable.

I claim:

1. A universal joint trunnion bearing assembly comprising a bearing having a cylindrical inner wall, a trunnion member having spaced coaxial walls, the outer of said trunnion walls being in the form of a collar separate from and mounted upon a shoulder formed integrally with the trunnion, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said packing means and the roller maintaining means being received in an annular space defined between radially opposed regions of said trunnion walls and said packing means being in contact with said inner trunnion wall and being under compression in the assembled joint, said roller maintaining means being closely telescoped in the outer of said trunnion member walls to shield said packing means.

2. A universal joint trunnion bearing assembly comprising a bearing having a cylindrical inner wall, a trunnion member having spaced coaxial walls, the outer of said trunnion walls being in the form of a collar separate from and mounted upon a shoulder formed integrally with the trunnion, bearing rollers engaging said bearing wall and the inner of said trunnion member walls and holding them coaxial, means cooperating with said bearing for maintaining said rollers in cooperative relation to said inner walls, packing means spaced from the outer of said trunnion member walls and cooperating with said roller maintaining means in providing a seal between said bearing and said inner trunnion wall, said packing means and the roller maintaining means being received in an annular space defined between radially opposed regions of said trunnion walls and said packing means being in contact with said inner trunnion wall and being under compression in the assembled joint, said roller maintaining means being closely telescoped with the outer of said trunnion member walls to shield said packing means, the telescoping portions being so arranged that the surrounding portion extends radially outwardly beyond the inner end of surrounded portion.

3. A universal joint trunnion bearing assembly comprising a trunnion member having an inner wall including a cylindrical bearing wall, a bearing cup having a cylindrical interior bearing wall, bearing rollers engaged between said bearing walls, a retainer ring mounted in the end of said bearing cup, said ring having a cylindrical skirt portion and a portion projecting radially inwardly and cooperating with said bearing rollers for maintaining them in assembled relationship in the cup, a ring of packing material supported in said retainer ring and in sealing contact therewith and with said inner trunnion wall under compression to provide a seal for retaining lubricant in the space occupied by said bearing rollers, said packing ring and skirt both projecting beyond the end of the bearing cup, said trunnion having a structurally independent collar coaxial with said inner trunnion wall and spaced radially therefrom to define, together with a radially opposed portion thereof, an annular channel in which both said packing ring and skirt are received, said skirt being closely telescoped in said collar to shield the packing ring.

4. A universal joint trunnion bearing assembly comprising a trunnion member having an inner wall including a cylindrical bearing wall and, at the base of said trunnion, a wall portion flaring into an integral shoulder, a bearing cup having a cylindrical inner bearing wall, bearing rollers engaged between said inner walls, a retainer ring having a cylindrical skirt portion pressed into the end of said bearing cup and a radial flange cooperating with said rollers for maintaining them in assembled relationship in the cup, a ring of packing material supported in said retainer ring and in sealing contact therewith and with said inner trunnion wall under compression to provide a seal for retaining lubricant in the space occupied by said bearing rollers, said packing ring and skirt both projecting beyond the end of the bearing cup, said trunnion member including a structurally independent collar pressed upon said shoulder and projecting therebeyond to define, together with a radially opposed portion of said inner trunnion wall, an annular channel in which both said skirt and said packing ring are received, said skirt being closely telescoped in said collar to form a centrifugal seal for excluding dirt from the packing ring.

5. A universal joint trunnion bearing assembly comprising a trunnion member having an inner wall including a cylindrical bearing wall, and, at the base of the trunnion, a wall portion flaring into an integral shoulder, a bearing cup having a cylindrical interior bearing wall, bearing rollers engaged between said bearing walls, a retainer ring mounted in the end of said bearing cup, said ring having a cylindrical skirt portion and a portion projecting radially inwardly and cooperating with said bearing rollers for maintaining them in assembled relationship in the cup, a ring of packing material supported in said retainer ring and in sealing contact therewith and with both the cylindrical and the flaring portions of said inner trunnion wall under compression to provide a seal for retaining lubricant in the space occupied by said rollers, said packing ring and skirt both projecting beyond the end of the bearing cup, and a structurally independent collar pressed upon said trunnion shoulder and projecting therebeyond to define, together with a radially opposed portion of said trunnion inner wall, an annular channel in which both said skirt portion and said packing ring are received, said skirt being closely telescoped in said collar to form therewith a centrifugal seal for excluding dirt from said packing ring.

6. A universal joint trunnion bearing assembly comprising a trunnion member having at its base a radially outwardly projecting integral shoulder and having an inner wall including a cylindrical bearing wall portion and a portion flaring outwardly into said shoulder, a bearing cup having a cylindrical interior bearing wall, having at its open end a counterbore of larger diameter than said interior bearing wall and having a shoulder intermediate said interior bearing wall and said counterbore, bearing rollers engaged between said bearing walls, a retainer ring having a cylindrical skirt portion pressed into said counterbore and having a flange seated against said shoulder and projecting radially inwardly and cooperating with said rollers for maintaining them in assembled relationship in the cup, a ring of packing material supported in said retainer ring and in sealing contact therewith and with both the cylindrical and the flaring portions of said inner trunnion wall under compression to provide a seal for retaining lubricant in the space occupied by said rollers, said packing ring and skirt both projecting beyond the end of the bearing cup, and a structurally independent collar pressed upon said trunnion shoulder and projecting therebeyond to define, together with a radially opposed portion of said trunnion inner wall, an annular channel in which both said skirt portion and said packing ring are received, said skirt being closely telescoped in said collar to form therewith a centrifugal seal for excluding dirt from said packing ring.

CARL E. SWENSON.